United States Patent [19]

Lee et al.

[11] Patent Number: 5,543,931
[45] Date of Patent: Aug. 6, 1996

[54] APPARATUS FOR AND METHOD OF REPRODUCING DIGITAL VIDEO SIGNALS AT A VARIED SPEED

[75] Inventors: Je H. Lee; Choon Lee, both of Seoul, Rep. of Korea

[73] Assignee: Goldstar Co., Ltd., Seoul, Rep. of Korea

[21] Appl. No.: 238,313

[22] Filed: May 5, 1994

[30] Foreign Application Priority Data

May 18, 1993 [KR] Rep. of Korea .................. 8497/1993

[51] Int. Cl.$^6$ .................................................. H04N 5/765
[52] U.S. Cl. .......................... 358/335; 348/423; 358/312
[58] Field of Search .................................. 358/335, 312; 348/423; H04N 5/945

[56] References Cited

U.S. PATENT DOCUMENTS

| | | | |
|---|---|---|---|
| 5,168,356 | 12/1992 | Acampora | 370/110.1 |
| 5,377,014 | 12/1994 | Knauer | 358/335 |

FOREIGN PATENT DOCUMENTS

| | | |
|---|---|---|
| 0501699 | 2/1992 | European Pat. Off. . |
| 0533947 | 7/1992 | European Pat. Off. . |
| 0541029 | 11/1992 | European Pat. Off. . |

OTHER PUBLICATIONS

"Enhancement of Digital Television Signals Corrupted By Channel Errors"; Mar. 17, 1993; by A. Benazza, G. Tziritas; pp. 1–4, of 1993 Picture Coding Symposium Proceedings, Lausanne, Switzerland.

"A Flexible And Robust Packet Transport Protocol For Digital HDTV"; Dec. 6, 1992; by C. Raychaudhuri, R. Siracusa, J. Zdepski, K. Joseph; pp. 1374–1380 of IEEE Global Telecommunications Conference, 1992.

*Primary Examiner*—Howard W. Britton

[57] ABSTRACT

An apparatus for, and a method of, reproducing digital video signals at a varied speed, adapted to insert information about the maximum coded lengths of digital video signals in slices resulting from encoding and compressing of the digital video signals by a digital video signal transmitter so that the inserted information can be transmitted together with the compressed digital video signal, and to insert slice condition information and slice length information in slice headers of slices upon reproducing the digital video signals recorded on a tape at a varied speed so that the inserted slice condition information and slice length information can be deformatted together with the slices. The apparatus and method is thus capable of decoding the digital video signals for macroblocks preceding the macroblock involving a discontinuous interval based on the maximum coded length information, slice condition information and slice length information.

9 Claims, 10 Drawing Sheets

| FLAG INFORMATION | NUMBER OF BITS |
|---|---|
| Imax | 12bits |

FIG.8C

| If | CONDITION OF REPRODUCED BIT STRING |
|---|---|
| 0 | NORMAL REPRODUCTION |
| 1 | REPRODUCTION |

FIG.8D

| Is | CONDITION OF REPRODUCED SLICE |
|---|---|
| 0 | COMPLETELY REPRODUCED SLICE |
| 1 | INCOMPLETELY REPRODUCED SLICE |

FIG.8E

| Ix | NUMBER OF BITS |
|---|---|
| LENGTH OF REPRODUCED SLICE | 18bits |

FIC .11

APPARATUS FOR AND METHOD OF REPRODUCING DIGITAL VIDEO SIGNALS AT A VARIED SPEED

BACKGROUND OF THE INVENTION

1. Field of the Invention

The present invention relates to a digital video cassette tape recorder (VCR) connected between a digital video signal transmitter and a digital video signal receiver, and more particularly to an apparatus for, and a method of, reproducing digital video signals at a varied speed in such a digital VCR.

2. Description of the Prior Art

Generally, NTSC broadcast signals are transmitted at a bit rate of about 200 Mbit/s. However, digital video signals as the next generation broadcast signals are transmitted at a bit rate of about 1.2 Gbit/s. For transmitting such digital video signals via the channel of VHF of about 6 MHz or via UHF, the digital video signals are typically compressed at a compression ratio of 5:1 or 10:1 in a digital video signal transmitter to have the form of a bit stream.

After being transmitted via the transmission channel, bit streams of data compressed by the digital video signal transmitter are recorded on a tape by a digital VCR. In a reproduction mode, the bit streams recorded on the tape are reproduced by the digital VCR and then decoded by a digital video signal receiver to be displayed on a screen.

Producing such a digital VCR on a commercial scale requires the capability of reproducing digital video signals recorded on the tape in normal and reverse directions at various speeds.

When a speed-varied travel mode or a reverse travel mode is selected in such a digital VCR having the above-mentioned functions, bit streams recorded on the tape are discontinuously reproduced. As a result, the-reproduced bit streams have the form of discontinuous data bursts which are different from that of the recorded bit streams.

This will be described in detail, in conjunction with FIGS. 1A to 1D.

Figures 1A, 1B:
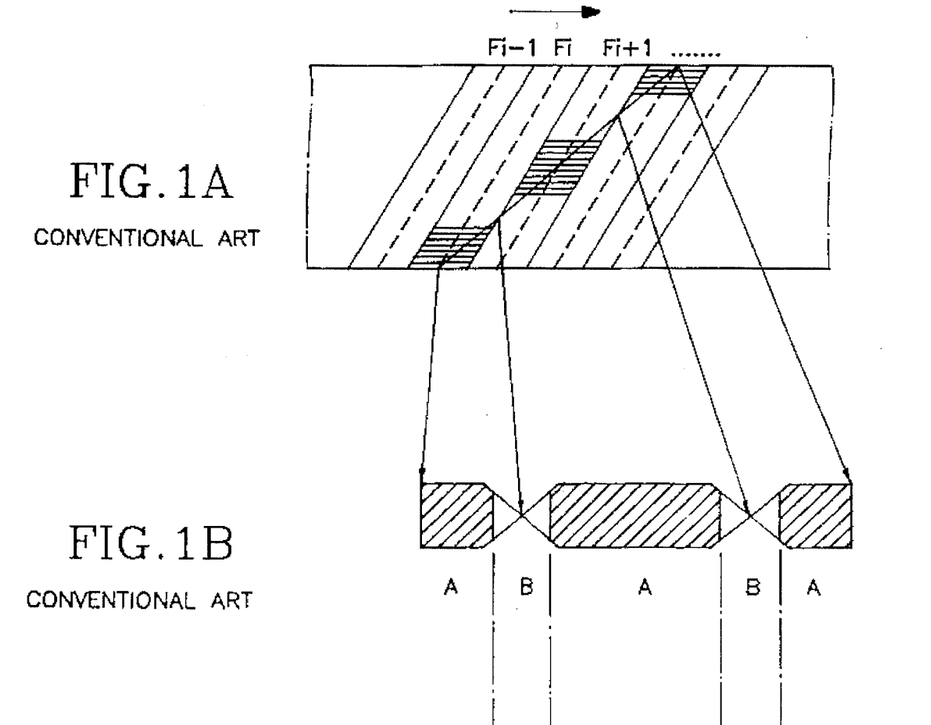
FIGS. 1A to 1D are schematic views respectively illustrating a reproduced bit string of digital video signals recorded on a tape in a speed-varied reproduction mode, in accordance with the prior art.

When the speed-varied travel mode is selected, reproduction heads of the digital VCR travel along a trace across recording tracks on a tape. Assuming that the reproduction heads travel along a trace extending across a recording track Fi and a recording track Fi+1 adjacent to the recording track Fi, as indicated by an arrow in FIG. 1A, bit streams reproduced have an envelope including intervals A enabling a detection of digital video signals and intervals B disabling the detection of digital video signals, as shown in FIG. 1B. The intervals A and B are repeatedly generated in an alternating manner.

Figure 1C:
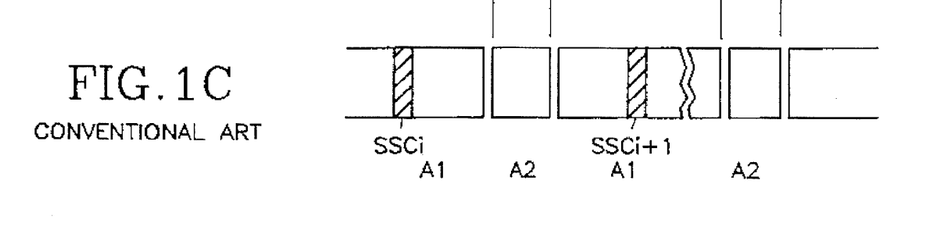

As shown in FIG. 1C, each of the detection enable intervals A includes an interval portion A1 enabling the detection of digital video signals and an interval portion A2 with digital video signal discontinuously reproduced.

Figure 1D:
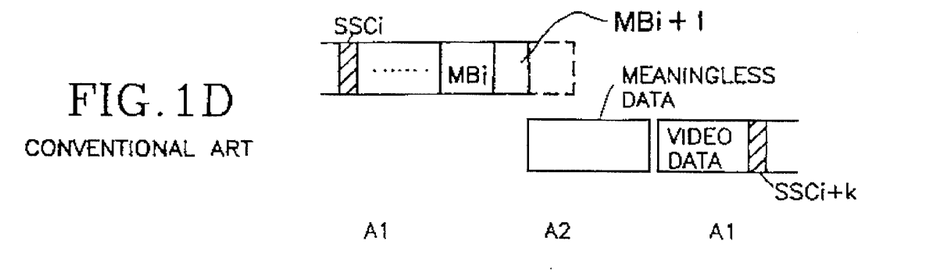
Figure 2:
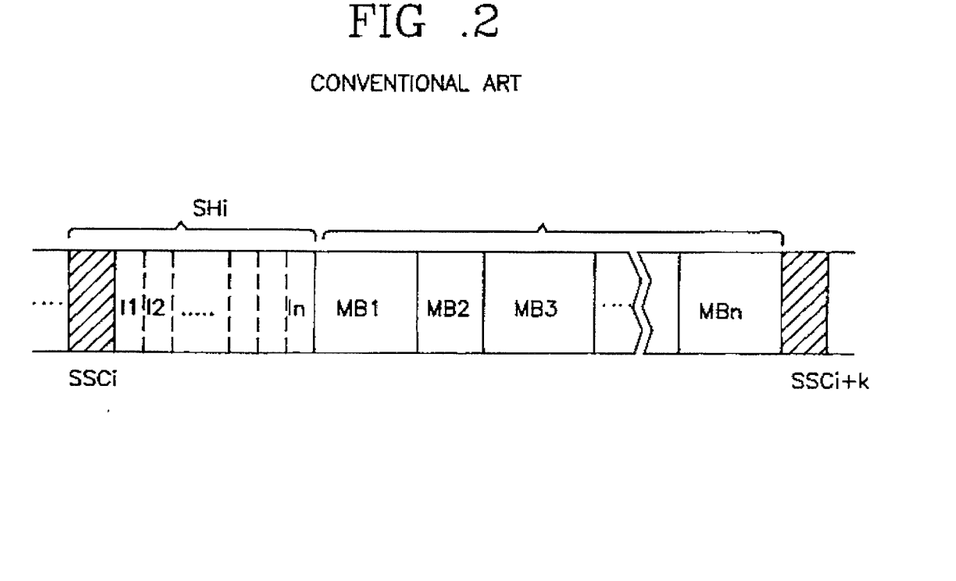
FIG. 2 is a schematic view illustrating a bit string of digital video signals for one slice in accordance with the prior art.

Digital video signals reproduced after generation of a discontinuous point in each detection enable interval A are meaningless data, as shown in FIG. 1D. Such digital video signals can not be decoded by a digital video signal receiver.

In other words, a digital video signal reproduced from the tape is divided into slices, each of which is the basic synchronization unit. A variable length-coded digital video signal for every slice is divided into macroblocks again. Digital video signals for macroblocks involved in the discontinuous interval A2 can not be reproduced.

This will be described in detail, in conjunction with FIG. 1D. In a case wherein an i-th macroblock MBi and an i+1-th macroblock MBi+1 in a slice have been recorded on the tape in a continuous manner, the i+1-th macroblock MBi+1 involving the discontinuous interval A2 can not be totally reproduced, but is partially reproduced. When a digital video signal indicative of the i+1 macroblock MBi+1 is partially reproduced, (namely, the discontinuous interval A2 is decoded in the receiver,) error may occur. As a result, subsequent digital video signals form a meaningless bit stream which can not be displayed on a screen.

Accordingly, a variable length decoding for digital video signals is initiated when a decodable slice start code SSCi is detected and is until a digital video signal indicative of the i-th macroblock is detected. From this point, digital video signals reproduced from the tape are not decoded until the next slice start code SSCi+1 is detected.

However, the above-mentioned general digital VCR can not decode directly digital video signals of macroblocks reproduced from the tape. These reproduced digital video signals are decoded in the digital video signal receiver.

Although the digital VCR can detect every discontinuous interval, it can not detect the end of the i-th macroblock MBi just preceding the discontinuous interval.

Figure 3:
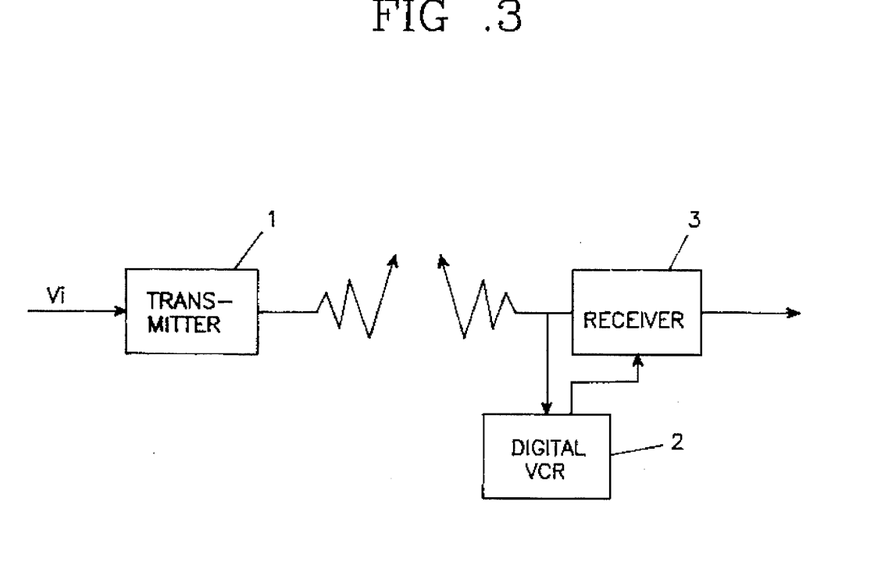
FIG. 3 is a block diagram of a speed-varied reproduction apparatus for digital video signals in accordance with the present invention.

For reducing error generated in the process of decoding reproduced digital video signals of macroblocks following the macroblock MBi+1 involving a discontinuous point, respective variable length-coded length information I1 to In of digital video signals of macroblocks MB1 to MBn included in each slice Si are recorded on corresponding slice headers SHi, as shown in FIG. 3, so that they are transmitted together with the digital video signals.

Using the coded length information I1 to In of digital video signals of macroblocks MB1 to MBn included in each slice Si, the digital VCR detects respective positions of macroblocks decodable by the digital video signal receiver. The digital video signals respectively corresponding to the detected positions are decoded by the digital video signal receiver 3.

In the above-mentioned system, however, there is a problem of a reduced compression rate of digital video signals because coded length information for all macroblocks are recorded on corresponding slice headers.

SUMMARY OF THE INVENTION

Therefore, an object of the invention is to provide an apparatus for and a method of reproducing digital video signals at a varied speed, adapted to record the maximum one of coded length information of macroblocks included in each slice, slice condition information indicative of the presence of a discontinuous interval in each slice, and information about decodable slice length, and which is thereby capable of improving the compression rate, achieving a decoding without any error, and consequently realizing high picture quality in a speed-varied reproduction mode.

In accordance with one aspect of the invention, the present invention provides an apparatus for reproducing digital video signals at a varied speed, comprising: a digital video signal transmitter for recording the maximum one of coded length information of macroblocks included in each one of slices corresponding to an input digital video signal on each corresponding slice header and transmitting it together with the macroblocks; a digital video cassette tape recorder for detecting the position of a discontinuous interval of each discontinuous-interval-involving one of the slices transmitted from the transmitter via a transmission channel in a speed-varied reproduction mode, and inserting slice condition information and slice length information generated at the detected discontinuous interval position in each corresponding slice header, thereby formatting the information together with digital video signals for the slice; and a digital video signal receiver for decoding the digital video signals for each slice reproduced in the digital video cassette tape recorder up to a macroblock just preceding a macroblock involving the discontinuous interval by use of the maximum coded length information, slice condition information and slice length information reproduced in the digital video cassette tape recorder.

In accordance with another aspect of the invention, the present invention provides a method for reproducing digital video signals at a varied speed, comprising the steps of: (a) initializing an index indicative of the number of encoded macroblocks of a slice for compressed digital video signals and maximum coded length information indicative of the number of bits coded with the maximum length when a slice start code is detected from one of the digital video signals; (b) comparing the index with the total number of macroblocks included in the slice to be encoded, encoding a macroblock just following the encoded macroblocks when the index is not more than the total macroblock number, counting the coded length of the currently encoded macroblock, and comparing the counted coded length with the maximum coded length information; (c) storing the counted coded length as new maximum coded length information when the coded length is determined to be more than the maximum coded length information at the step (b), and incrementing the index by one; (d) only incrementing the index by one without storing the counted coded length as new maximum coded length information when the coded length is not determined to be more than the maximum coded length information at the step (b); and (e) repeatedly executing the steps (b) to (d) when the index is not determined to be more than the total macroblock number at the step (b), and inserting the maximum coded length information in a slice header of the slice when the index is determined to be more than the total macroblock number at the step (b).

In accordance with another aspect of the invention, the present invention provides a method for reproducing digital video signals at a varied speed, comprising the steps of: (a) clearing a coded length of a previously decoded slice just preceding a slice to be currently decoded when a slice start code of the current slice is detected, initializing an index, indicative of the number of decoded macroblocks of the current slice, to be "1", and detecting maximum coded length information and slice condition information inserted in a slice header of the current slice; (b) checking whether the detected slice condition information is "0" indicative of a completely decodable slice or "1" indicative of an incomplete slice involving a discontinuous interval, and executing a decoding for all the macroblocks included in the current slice when the detected slice condition information is "0"; (c) detecting slice length information when the detected slice condition information is "1", and executing a decoding for one of the macroblocks of the current slice, based on the detected slice length information; (d) counting the coded length of the decoded macroblock, and comparing the difference between the counted coded length and the detected slice length information with the detected maximum coded length information; (e) executing a next macroblock just following the decoded macroblock when the difference between the counted coded length and the detected slice length information is not less than the maximum coded length information, and adding the coded length of the decoded next macroblock to the coded length of the first macroblock to count the total decoded length of the current slice decoded; (f) incrementing the index by one after completing the step (e), repeatedly executing the steps (c) to (e) until the difference between the total decoded length of the current slice decoded and the detected slice length information is less than the maximum coded length information, and stopping the decoding of the step (c) until a slice start code of a next slice just following the current slice when the difference between the total decoded length of the current slice decoded and the detected slice length information is less than the maximum coded length information.

BRIEF DESCRIPTION OF THE DRAWINGS

Other objects and aspects of the invention will become apparent from the following description of embodiments with reference to the accompanying drawings in which:

FIG. 6 is a flow chart illustrating a procedure of inserting the maximum one of coded length information of macroblocks of a slice in a slice header in accordance with the present invention;

FIG. 9 is a block diagram of an envelope comparing circuit of the digital VCR shown in FIG. 7;

FIG. 10 is a schematic view illustrating an envelope of reproduced digital video signals detected by the envelope comparing circuit shown in FIG. 9;

FIG. 13 is a schematic view illustrating a bit string of synchronous blocks involving a discontinuous interval, detected by the synchronous block size comparing circuit shown in FIG. 12;

FIG. 14 is a schematic view illustrating a decoded bit string of digital video signals reproduced at a varied speed, in accordance with the present invention; and FIG. 15 is a flow chart illustrating a procedure of decoding digital video signals reproduced at a varied speed, in accordance with the present invention.

DETAILED DESCRIPTION OF THE PREFERRED EMBODIMENTS

FIG. 3 is a block diagram illustrating an apparatus for reproducing digital video signals at a varied speed in accordance with the present invention. As shown in FIG. 3, the apparatus comprises a digital video signal transmitter 1 for recording the maximum one Imax of coded length information I1 to In of macroblocks MB1 to MBD included in each one Si of slices corresponding to an input digital video signal on each corresponding slice header SHi and transmitting it together with the macroblocks MB1 to MBn. A digital VCR 2 is also provided for detecting the position of a discontinuous interval of each discontinuous interval involving one of the slices transmitted from the transmitter 1 via a transmission channel in a speed-varied reproduction mode, inserting slice condition information Is and slice length information Ix generated at the detected discontinuous interval position in each corresponding slice header SHi, and inserting speed variation information If indicative of the speed-varied reproduction mode in each corresponding picture head SHi, thereby formatting the information Ix and If together with digital video signals for the slice. The apparatus further comprises a digital video signal receiver 3 for decoding the digital video signals for each slice reproduced in the digital VCR 2 up to a macroblock MB−1 just preceding a macroblock MBi involving the discontinuous interval by use of the maximum coded length information Imax, slice condition information Is and slice length information Ix reproduced in the digital VCR 2.

Figure 4:
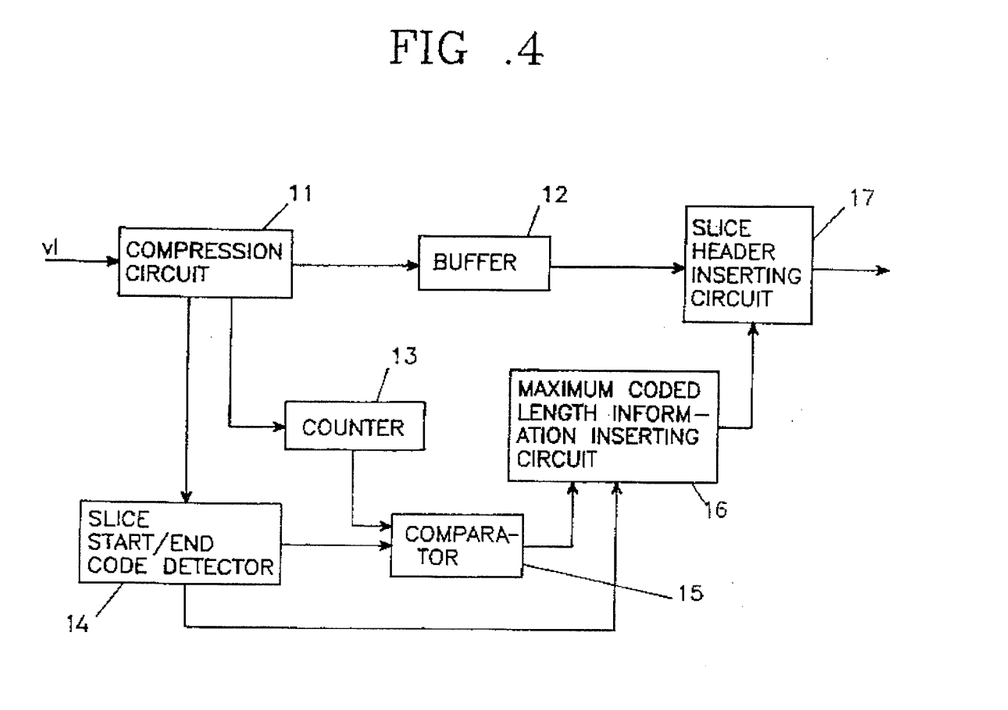
FIG. 4 is a block diagram of a digital video signal transmitter of the apparatus shown in FIG. 3.

As shown in FIG. 4, the transmitter 1 includes a compression circuit 11 for dividing a digital video signal for one picture into ones for slices and compression-encoding them to produce ones for macroblocks, a buffer 12 for delaying the compressed digital video signals, a counter 13 for counting variable-length-coded length information I1 to In of the digital video signals for macroblocks outputted from the compression circuit 11, a slice start/end code detector 14 for detecting a slice start code SSCi indicative of the start of each slice Si outputted from the compression circuit 11 and outputting an initialization signal for initializing maximum coded length information Imax, a comparator 13 for initially comparing the initialization signal outputted from the slice start/end code detector 14 with the initial coded length information I1 outputted from the counter 13, storing the higher one of the compared values as the maximum coded length information Imax, then comparing the stored maximum coded length information Imax with the coded length information Ii outputted from the counter 13, and storing the higher one of the compared values as new maximum coded length information Imax, a maximum coded length information inserting circuit 16 for inserting the maximum coded length information Imax outputted from the comparator 15 in a corresponding slice header, and a slice header inserting circuit 17 for inserting a slice header SHi with the maximum coded length information Imax in the corresponding slice Si temporarily stored in the buffer 12.

Figure 7:
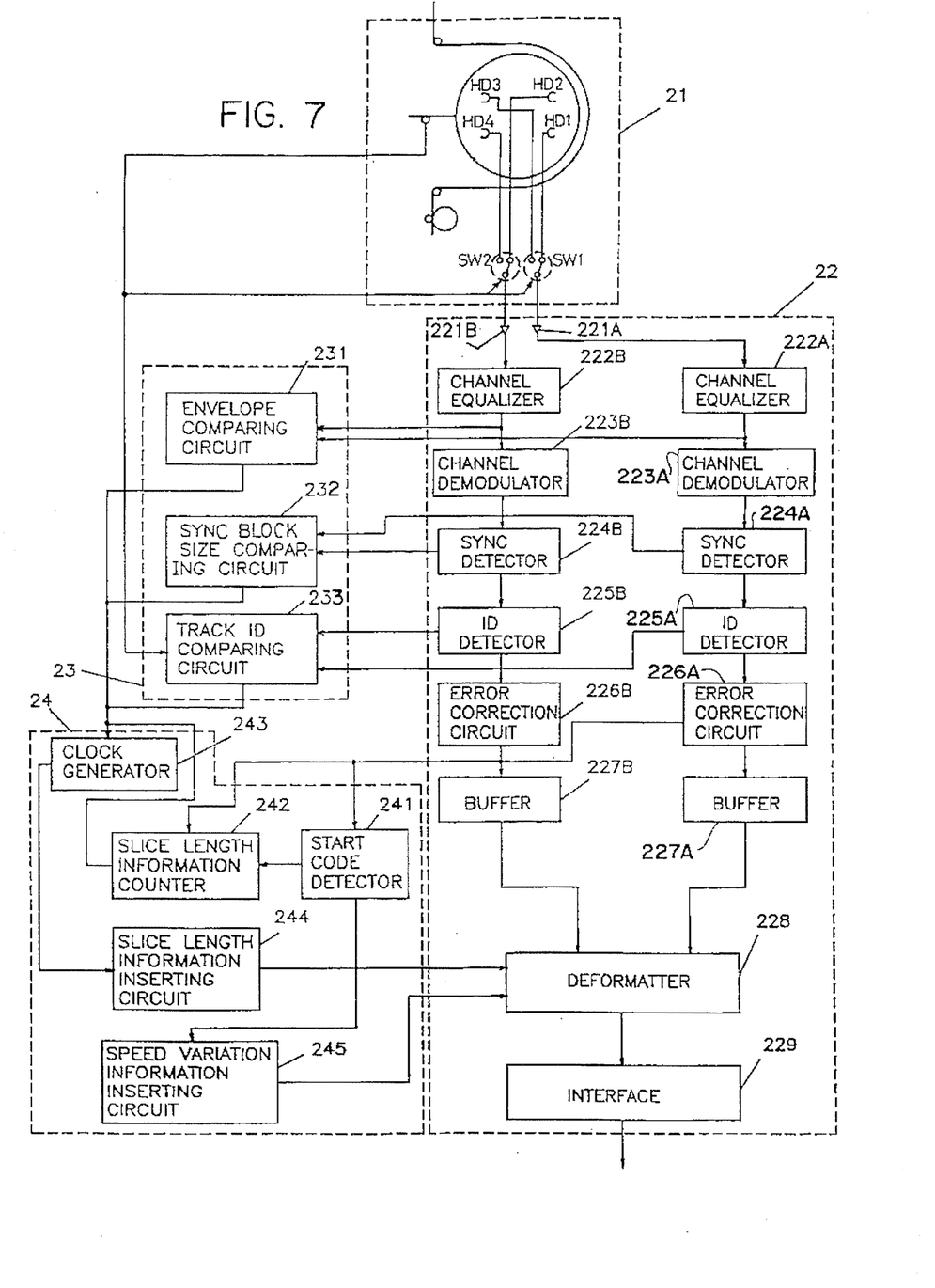
FIG. 7 is a block diagram of a digital VCR of the apparatus shown in FIG. 3.

As shown in FIG. 7, the digital VCR 2 includes a tape travelling circuit 21 for passing digital video signals sequentially reproduced by reproduction heads HD1 to HD4 through switches SW1 and SW2 switched by a head switching signal, a signal reproduction circuit 22 for amplifying the digital video signals outputted from the tape travelling circuit 21 to a predetermined level and performing a demodulation and an error correction for the amplified digital video signals, a discontinuous-interval detecting circuit 23 for detecting, from the digital video signals, positions of slices each of which are associated with a discontinuous interval involving generation of decoding error in a speed-varied reproduction mode, and an additional information inserting circuit 24 for inserting slice length information Ix and slice condition information Is detected from each of the detected slice positions in a corresponding slice header and inserting speed variation information If in a corresponding-picture header.

The signal reproduction circuit 22 includes a pair of reproduction amplifiers 221A and 221B, a pair of equalizers 222A and 222B, a pair of channel demodulators 223A and 223B, a pair of synchronous signal detectors 224A and 224B, a pair of identification data (ID) detectors 225A and 225B, a pair of error correction circuits 226A and 226B, a pair of buffers 227A and 227B, a deformatter 228 and an interface 229.

The discontinuous-interval detecting circuit 23 includes an envelope comparing circuit 231 for detecting levels of envelopes of digital video signals outputted from the channel equalizers 222A and 222B of the signal reproduction circuit 22, comparing each detected envelope level with a predetermined threshold value Dth and outputting the position of each slice involving a discontinuous interval, based on the result of the comparison, a synchronous block size comparing circuit 232 for counting the size of synchronous blocks sequentially outputted from the synchronous signal detectors 224A and 224B of the signal reproduction circuit 22, comparing the counted synchronous block size with the size of synchronous blocks reproduced in a normal reproduction mode, and detecting the position of each slice involving the discontinuous interval, based on the result of the comparison, and a track identification data comparing circuit 233 for comparing one, indicative of information about a track associated with the slice, of identification data outputted from the identification data detectors 225A and 225B of the signal reproduction circuit 22 with identification data indicative of information about another track adjacent to the track and detecting positions of discontinuous intervals.

The discontinuous interval detecting circuit 23 may comprise only one of the envelope comparing circuit 321, the synchronous block size comparing circuit 232, and the track identification data comparing circuit 233.

As shown in FIG. 9, the envelope comparing circuit 231 includes an envelope detector 231A adapted to detect levels of envelopes of digital video signals frequency-compensated in and sequentially outputted from the channel equalizers 222A and 222B, a comparator 231B adapted to compare each envelope level outputted from the envelope detector 231A with the predetermined threshold value Dth, and a position information generator 231C adapted to detect the position of each discontinuous interval, based on the result of the comparison from the comparator 231B and output the detected position to the additional information inserting circuit 24.

Figure 12:
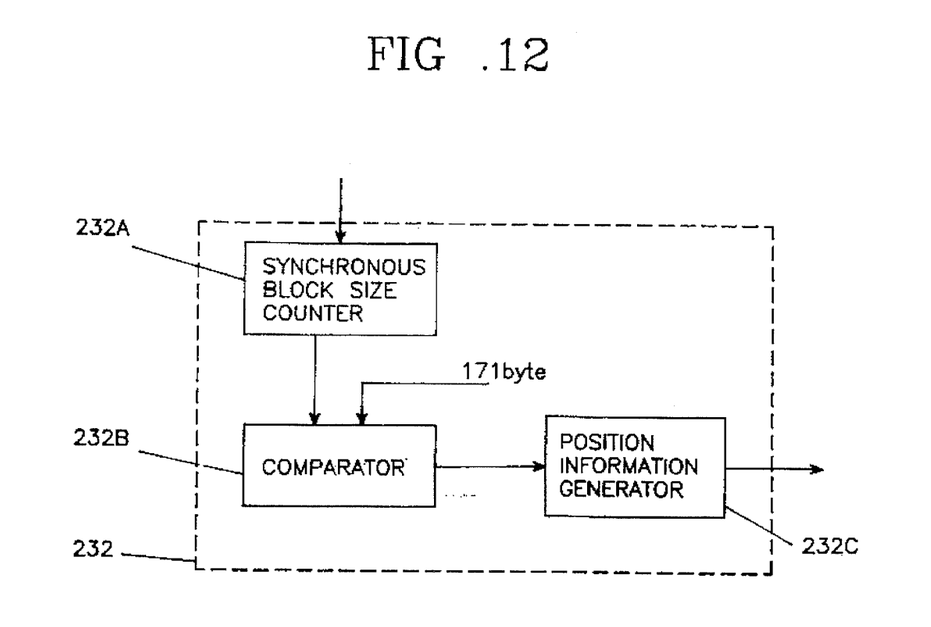
FIG. 12 is a block diagram of a synchronous block size comparing circuit of the digital VCR shown in FIG. 7.

As shown in FIG. 12, the synchronous block size comparing circuit 232 includes a synchronous block counter adapted to count the size of synchronous blocks sequentially outputted from the synchronous block detectors 224A and 224B of the signal reproduction circuit 22, a comparator 232B adapted to compare the synchronous block size outputted from the synchronous block counter 232A with the size of synchronous blocks reproduced in the normal reproduction mode, and a position information generator 232C adapted to detect the position of each discontinuous interval, base on the result of the comparison from the comparator 232B, and output the detected position to the additional information inserting circuit 24.

On the other hand, the additional information inserting circuit 24 shown in FIG. 7 includes: a start code detector 241 adapted to detect a picture code start code PPC indicative of the start of digital video signals for one field or one frame outputted from each of the error correcting circuits 226A and 226B of the signal generating circuit 22 and a slice start code SSC indicative of the start of each slice of the one field or one frame; a slice length counter 242 adapted to detect the slice start code SSC outputted from the start code detector 241, to count the length of the slice extending to the discontinuous interval, based on the discontinuous interval position detected by the discontinuous interval detecting circuit 23, and to output slice length information Ix corresponding to the counted slice length; a clock generator 243 adapted to generate a clock signal, based on the discontinuous interval position detected by the discontinuous position detecting circuit 23; a slice length information inserting circuit 244 adapted to insert the slice length information Ix outputted from the slice length counter 242 in accordance with the clock signal generated from the clock generator 243; and a speed variation inserting circuit 245 adapted to insert speed variation information in a corresponding picture header upon detecting the picture header start code PPC outputted from the start code detector 241 so as to apply it to the deformatter 228 of the signal reproduction circuit 22.

Now, operation of the speed-varied reproduction apparatus for digital video signals having the above-mentioned arrangement will be described, in conjunction with FIGS. 4 to 15.

First, digital video signals from a video source are sequentially applied to the transmitter 1. The digital video signals are subjected to a variable length coding in the compression circuit 11 so that they can be compressed. Each of the compressed digital video signals are then temporarily stored in the buffer 12.

The compressed digital video signals for macroblocks from the compression circuit 11 are also sequentially applied to the slice start/end code detector 14 which, in turn, operates to detect a slice start code SSCi and a slice end code SECi from the received digital video signals. When the slice start code SSCi is detected by the slice start/end code detector 14, an initialization for maximum coded length information Imax is carried out in the comparator 15.

The compressed digital video signals from the compression circuit 11 are also sequentially applied to the counter 13 which, in turn, first counts the coded length information I1 of the first one MB1 of macroblocks MB1 to MBn of each slice.

The coded length information I1 from the counter 13 is applied to the comparator 15 which, in turn, compares the received coded length information I1 with the maximum coded length information Imax stored therein and then stores the higher value as new maximum coded length information Imax.

Figure 5:
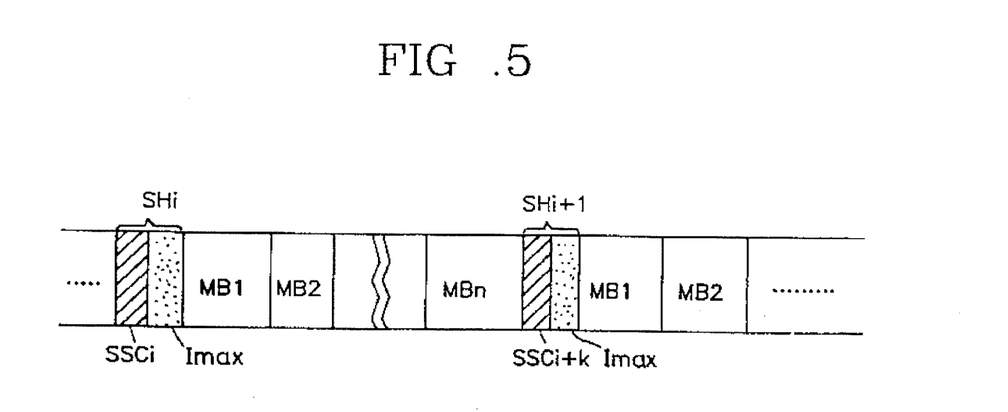
FIG. 5 is a schematic view illustrating a bit string of a slice outputted from the digital video signal transmitter shown in FIG. 4.

The above procedure is repeated every time when each of coded length information I2 to In of subsequent macroblocks MB2 to MBn is counted. When the slice end code SECi is detected by the slice start/end code detector 14 during subsequent procedures, the maximum coded length information Imax outputted from the comparator 15 is inserted in a corresponding slice header SHi just behind the corresponding slice start code SSCi by the maximum coded length information inserting circuit 16, as shown in FIG. 5.

The above procedures will be described in detail in conjunction with FIG. 6. Input digital video signals for one field or one frame are compressed into ones for slices by the compression circuit 11. When the slice start code SSCi is detected from one of digital video signals for each slice, the macroblock index i of the slice is set as 1 while the maximum coded length information Imax is initialized to zero.

The macroblock index i is then compared with the total number n of macroblocks included in the slice associated with the detected slice start code SSCi. When the macroblock index i is not more than the total macroblock number n, the coded length I1 of the first macroblock MB1 bearing the index of 1 is counted in the counter 13. The counted coded length I1 is compared with the maximum coded length information Imax. Since the maximum coded length information Imax has been initialized to zero, it is less than the coded length I1.

Where the coded length I1 is determined to be higher than the maximum coded length information Imax, it is stored again as new maximum coded length information Imax in the comparator 15. In this case, the macroblock index i is incremented to 2. Thereafter, the incremented macroblock index i is compared with the total macroblock number n.

When the coded length I2 is determined to be higher than the newly stored maximum coded length information Imax, the coded length I2 of the macroblock MB2 bearing the index of 2 is counted in the counter 13. The counted value is then compared with the maximum coded length information Imax stored in the comparator 15. The higher coded length determined after the comparison is stored again as new coded length information Imax.

This procedure is repeated until the slice end code SECi is detected in the slice .start/end code detector 13. When the slice end code SECi is detected, the maximum coded length information Imax is inserted to a corresponding slice header SHi. Under this condition, the digital video signals for slices bearing the maximum coded length information Imax are sequentially transmitted.

The resultant digital video signals from the transmitter 1 are received in the receiver 3 via a transmission channel, so that they can be directly outputted in the form of image and audio signals via a monitor or a speaker. Otherwise, the digital video signals are sequentially applied to the digital VCR 2 which, in turn, converts the received digital video signals into ones for a proper recording format so as to record them on a tape.

When the digital VCR 2 is selected by a user to operate in a speed-varied reproduction mode, the digital video signals recorded on the tape are reproduced by the reproduction heads HD1 to HD4 of the tape travelling circuit 21. The reproduced digital video signals are sequentially outputted via the switches SW1 and SW2 switched by a head switching signal.

The digital video signals passing through the switches SW1 and SW2 are sequentially applied to the reproduction amplifiers 221A and 221B in an alternating manner, so as to be amplified to a predetermined level. The amplified digital video signals from the, reproduction amplifiers 221A and 221B are then sent to the channel equalizers 222A and 222B, respectively, so as to compensate their frequency characteristic which is varied due to distortion resulting from the amplification. The digital video signals with compensated frequency characteristic from the channel equalizers 222A and 222B are sent to the channel demodulators 223A and 223B which, in turn, demodulate the received digital video signals, respectively.

The demodulated digital video signals outputted from the channel demodulators 223A and 223B are applied to the synchronous signal detectors 224A and 224B, respectively, which, in turn, divide the received digital video signals into ones for synchronous blocks. After the division, the synchronous signal detectors 224A and 224B detect synchronous signals Syn included in the synchronous blocks. Based on the detected synchronous signals Syn, the digital video signals for synchronous blocks are converted into parallel digital video signals.

The digital video signals outputted from the synchronous signal detectors 224A and 224B are sent to the identification data detectors 225A and 225B, respectively, which, in turn, detect identification data ID inserted in the synchronous blocks.

The detected identification ID from the identification data detectors 225A and 225B are then applied to the error correcting circuits 226A and 226B, respectively, which, in turn, correct errors of the digital video signals using error correction bits inserted in the synchronous blocks. The error-corrected digital video signals from the error correcting circuits 226A and 226B are applied to the buffers 227A and 227B, respectively, which, in turn, store temporarily the received digital video signals therein.

On the other hand, the discontinuous interval detecting circuit 23 detects a discontinuous interval generated in the speed-varied reproduction mode, from one of the digital video signals for slices reproduced by the signal reproduction circuit 22. This procedure of detecting the discontinuous interval will now be described in detail.

First, a digital video signal outputted from a selected one of the channel equalizer 222A and 222B of the signal reproduction circuit 22 is applied to the envelope comparing circuit 231, so that the envelope detector 231A of the envelope comparing circuit 231 detects the level of the envelope of the received digital video signal, as shown in FIG. 10. The detected envelope level is then compared with the predetermined threshold value D in the comparator 231B.

When the detected envelope level is determined to be less than the threshold value D, it is then applied to the position information generator 231C which, in turn, detects generation of a discontinuous interval, based on the envelope level less than the threshold value D. As the result of the detection, the position information generator 231C generates position information about the position at which the envelope level less than the threshold value D is detected.

Figure 11:
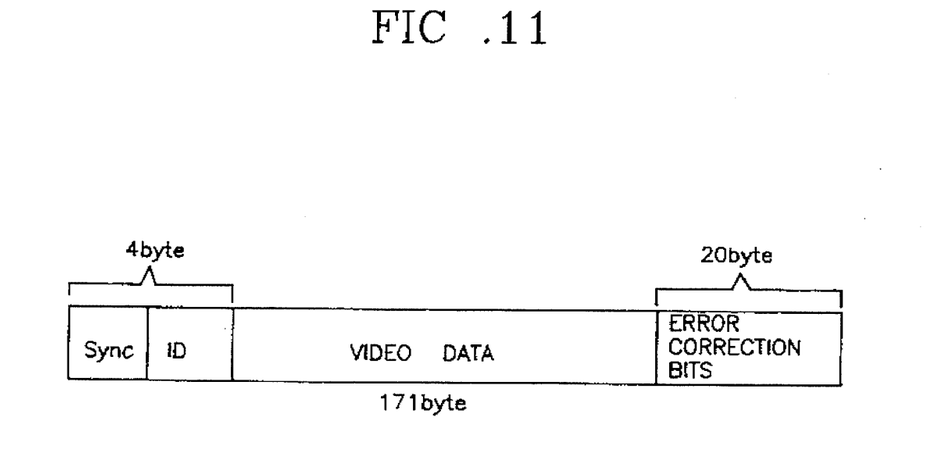
FIG. 11 is a schematic view illustrating a bit string of synchronous blocks outputted from a synchronous signal detecting circuit of the digital VCR shown in FIG. 7.

On the other hand, the size of the synchronous blocks outputted from the synchronous signal detectors 224A and 224B is counted in the synchronous block size counter 232A, as shown in FIG. 11. The counted value from the counter 232A is applied to the comparator 232B which, in turn, compares the received counted value with the reference synchronous block size (typically, including 171 bits) outputted from the synchronous signal detectors 224A and 224B in the normal reproduction mode.

When the counted value is less than the reference synchronous block size, a determination is made that a discontinuous interval has been generated in the counted synchronous blocks, as shown in FIG. 13. Based on this determination, the position information generator 232C generates position information about the position at which the discontinuous interval has been generated.

The synchronous blocks outputted from the synchronous signal detector 224A and 224B of the signal reproduction circuit 22 are also applied to the identification data detectors 225A and 225B, respectively, which, in turn, detect identification data ID inserted in the synchronous blocks. One, representing information about a track associated with the currently detected synchronous block, of the detected identification data ID from one of the identification data detectors 225A and 225B is compared with the identification data, representing an adjacent track associated with the previously detected synchronous block, from the other identification data detector. When the difference between these two identification data is more than a predetermined value, a determination is made that a discontinuous interval has been generated in the synchronous blocks, as shown in FIG. 13. Based on this determination, the track identification data comparing circuit 233 generates position information about the position at which the discontinuous interval has been generated.

The position information outputted from at least one of the envelope comparing circuit 231, the synchronous block size comparing circuit 232 and the track identification data comparing circuit 233 is applied to the clock generating circuit 244 of the information inserting circuit 24. Based on the position information, the clock generating circuit 244 generates a clock signal.

On the other hand, digital video signals for slices outputted from the error correcting circuits 226A and 226B of the signal reproduction circuit 22 are sequentially applied to the start code detector 241 of the additional information inserting circuit 24. From the digital video signals for each slice from the error correcting circuits 226A and 226B, the start code detector 241 detects a slice start code SSCi. Based on the slice start code SSCi and the clock signal from the clock generating circuit 244, the slice length information counter 243 counts slice length information fx about a slice involving the discontinuous interval.

Figure 8A:
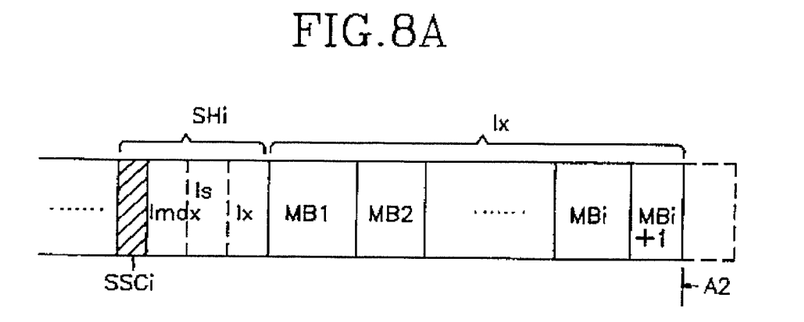
FIGS. 8A to 8E are schematic views respectively illustrating a slice formatted in the digital VCR of FIG. 7 in accordance with the present invention.

The slice length information fx from the counter 243 is then applied to the slice length information inserting circuit 244 which, in turn, inserts the slice length information fx in a corresponding slice header SHi, as shown in FIG. 8A.

Also, speed variation information If with flag varied in accordance with a selected reproduction mode and slice condition information Is indicative of the presence of a discontinuous interval in the slice Si in question are inserted in the corresponding slice header SHi, as shown in FIG. 8A, and then applied to the deformatter 228 of the signal reproduction circuit 22 so as to be deformatted.

Figure 8B:
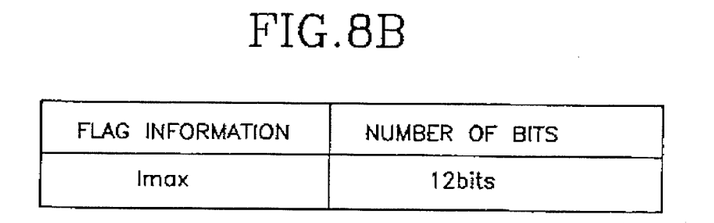
Figure 8C:
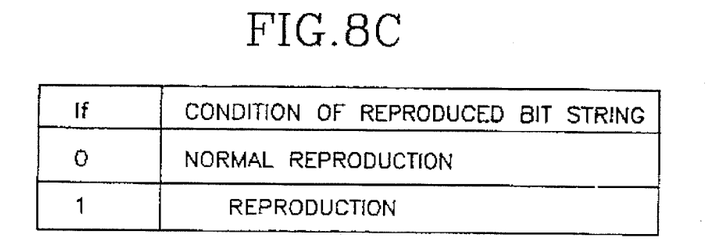
Figure 8D:
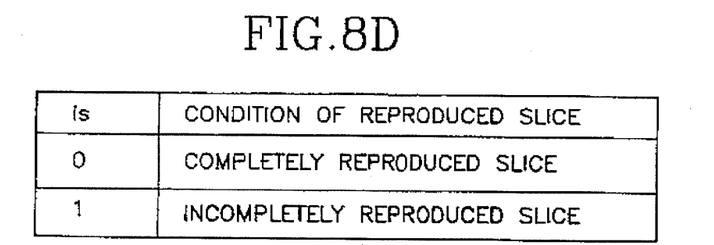
Figure 8E:
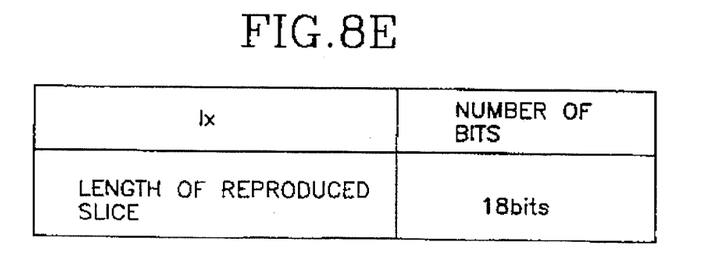

For example, where a speed-varied reproduction is selected by the user, the speed variation information If and the slice condition information Is are inserted in the corresponding slice header SHi and then deformatted, as shown in FIGS. 8C and 8D. On the other hand, the maximum coded length information Imax in the slice header SHi transmitted from the transmitter 1 is deformatted, as shown in FIG. 8B. The slice length information Ix is inserted in the corresponding slice header SHi and then deformatted, as shown in FIG. 8E.

The deformatted digital video signals for every slice are applied to the receiver 3 so as to be decoded. For this decoding, first, the maximum coded length information Imax inserted in the slice header SHi of the slice Si currently received in the receiver 3 is detected. The slice condition information Is of the current slice Si is then detected. When the slice condition information Is of 1 is detected, the current slice Si is determined as an incomplete slice caused by the speed-varied reproduction.

Thereafter, the slice length information Ix inserted in the slice header SHi is detected. After this detection, decoding for the first macroblock MB1 of the current slice Si is carried out.

After the decoding for the first macroblock MB1, the difference between the coded length I1 of the decoded first macroblock MB1 and the detected slice length information Ix is calculated. When the calculated difference is more than the maximum coded length information Imax, decoding for the second macroblock MB2 of the current slice Si is performed. A decoded length Id is then calculated by adding the coded length I2 of the decoded second macroblock MB2 to the coded length I1 of the first macroblock MB1. Thereafter, the difference between the calculated decoded length Id and the slice length information Ix is calculated. When the calculated difference is more than the maximum coded length information Imax, the third macroblock MB3 of the current slice Si is decoded.

The above procedure is repeatedly executed for macroblocks up to the macroblock MB−1 just preceding the macroblock MBi involving a discontinuous point.

Where the difference between the decoded length Id and the slice length information Ix is not more than the maximum coded length information Imax, as shown in FIG. 14, a determination is made that the macroblock MBi to be subsequently decoded involves a discontinuous interval. After this determination, no decoding is executed until the slice start code SSCi+1 of the next slice Si+1 is detected.

The above procedures will be described in detail, in conjunction with FIG. 15. First, when the slice start code SSCi of the current slice Si is detected, the decoded length Id of the previous slice Si−1 just preceding the current slice Si is cleared. Simultaneously, the macroblock index i of the current slice Si is initialized to be "1". Thereafter, the maximum coded length information Imax and the slice condition information Is inserted in the slice header SHi of the current slice Si are detected. A check is then made about whether the detected slice condition information Is is "1".

If the slice condition information Is is "0", the current slice Si is determined as a completely decodable slice. In this case, decoding for all macroblocks included in the current slice Si is executed in the receiver 3.

If the slice condition information Is is "1", however, the current slice Si is determined to be an incomplete slice. In this case, the slice length information Ix of the current slice Si is detected. Thereafter, the coded length of the macroblock MBi is counted to count the total decoded length Id of the current slice Si decoded by the receiver 3. The difference between the counted total decoded length Id and the detected slice length information Ix is then compared with the maximum coded length information Imax.

When the difference between the total decoded length Id and the slice length information Ix is not less than the maximum coded length information Imax, decoding for the next macroblock MBi+1 is executed in the receiver 3. The coded length of the decoded macroblock MBi+1 is then added to the total decoded length of the current slice Si for the decoded macroblocks up to the macroblock MBi. The macroblock index i is also incremented.

The above procedure is repeatedly executed until the difference between the total decoded length Id resulted from the coded length addition and the slice length information Ix is less than the maximum coded length information Imax. When the difference between the total decoded length Id and the slice length information Ix is less than the maximum coded length information Imax, decoding for macroblocks is stopped until the slice start code SSCi+1 of the next slice Si+1 is detected.

As apparent from the above description, the present invention provides an apparatus for and a method of reproducing digital video signals at a varied speed, adapted to insert information about the maximum coded lengths of digital video signals in slices resulted from encoding and compression of the digital video signals by a digital video signal transmitter so that the inserted information can be transmitted together with the compressed digital video signal, and to insert slice condition information and slice length information in slice headers of slices upon reproducing the digital video signals recorded on a tape at a varied speed so that the inserted slice condition information and slice length information can be deformatted together with the slices, thereby capable of decoding the digital video signals for macroblocks preceding the macroblock involving a discontinuous interval, based on the maximum coded length information, slice condition information and slice length information.

Accordingly, the present invention enables decoding for the maximum number of digital video signals with minimum additional information. As a result, it is possible to improve the decoding rate and execute the decoding without any error. Consequently, a high picture quality can be realized.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for reproducing digital video signals at a varied speed, comprising:

a digital video signal transmitter for recording the maximum one of coded length information of macroblocks included in each one of slices corresponding to an input digital video signal on each corresponding slice header and transmitting it together with the macroblocks;

a digital video cassette tape recorder for detecting the position of a discontinuous interval of each discontinuous-interval-involving one of the slices transmitted from the transmitter via a transmission channel in a speed-varied reproduction mode, and inserting slice condition information and slice length information generated at the detected discontinuous interval position in each corresponding slice header, thereby formatting the information together with digital video signals for the slice; and a digital video signal receiver for decoding the digital video signals for each slice reproduced in the digital video cassette tape recorder up to a macroblock just preceding a macroblock involving the discontinuous interval by use of the maximum coded length information, slice condition information and slice length information reproduced in the digital video cassette tape recorder.

2. An apparatus in accordance with claim 1, wherein the digital video signal transmitter comprises:

a compression circuit for dividing a digital video signal for one picture into ones for slices and compression-encoding them to produce ones for macroblocks;

a buffer for delaying the compressed digital video signals;

a counter for counting variable-length-coded length information of the digital video signals for macroblocks outputted from the compression circuit;

a slice start/end code detector for detecting a slice start code indicative of the start of each slice outputted from the compression circuit and outputting an initialization signal for initializing maximum coded length information;

a comparator for initially comparing the initialization signal outputted from the slice start/end code detector with the initial coded length information outputted from the counter, storing the higher one of the compared values as maximum coded length information, then comparing the stored maximum coded length information with the coded length information outputted from the counter, and storing the higher one of the compared values as new maximum coded length information;

a maximum coded length information inserting circuit for inserting the maximum coded length information outputted from the comparator in a corresponding slice header; and a slice header inserting circuit for inserting a slice header with the maximum coded length information in the corresponding slice temporarily stored in the buffer.

3. An apparatus in accordance with claim 1, wherein the digital video cassette tape recorder comprises:

a tape travelling circuit for passing digital video signals sequentially reproduced by reproduction heads through at least one switch switched by a head switching signal;

signal reproduction means for amplifying the digital video signals outputted from the tape travelling circuit to a predetermined level and performing a demodulation and an error correction for the amplified digital video signals;

discontinuous-interval detecting means for detecting, from the digital video signals, positions of slices each associated with a discontinuous interval involving generation of decoding error in a speed-varied reproduction mode; and additional information inserting means for inserting slice length information and slice condition information detected from each of the detected slice positions in a corresponding slice header.

4. An apparatus in accordance with claim 3, wherein the additional information inserting means comprises:

a start code detector adapted to detect a picture code start code indicative of the start of digital video signals for one field or one frame outputted from the signal generating circuit and a slice start code indicative of the start of each slice of the one field or one frame;

a slice length counter adapted to detect the slice start code outputted from the start code detector, count the length of the slice extending to the discontinuous interval, based on the discontinuous interval position detected by the discontinuous-interval detecting means, and output slice length information corresponding to the counted slice length;

a clock signal generator adapted to generate a clock, based on the discontinuous interval position detected by the discontinuous position detecting means;

a slice length information inserting circuit adapted to insert the slice length information outputted from the slice length counter in accordance with the clock signal generated from the clock generator; and a speed variation inserting circuit adapted to insert speed variation information in a corresponding picture header upon detecting the picture header start code outputted from the start code detector so as to apply it to the signal reproduction means.

5. An apparatus in accordance with claim 3, wherein the discontinuous-interval detecting means comprises:

an envelope comparing circuit for detecting levels of envelopes of digital video signals sequentially outputted from the signal reproduction means, comparing each detected envelope level with a predetermined threshold value and outputting the position of each slice involving a discontinuous interval, based on the result of the comparison;

a synchronous block size comparing circuit for counting the size of synchronous blocks sequentially outputted from the synchronous signal detectors of the signal reproduction means, comparing the counted synchronous block size with the size of synchronous blocks reproduced in a normal reproduction mode, and detecting the position of each slice involving the discontinuous interval, based on the result of the comparison; and a track identification data comparing circuit for comparing one, indicative of information about a track associated with the slice, of identification data outputted from the signal reproduction means with identification data indicative of information about another track adjacent to the track and detecting positions of discontinuous intervals.

6. An apparatus in accordance with claim 5, wherein the envelope comparing circuit comprises:

an envelope detector adapted to detect levels of envelopes of digital video signals from the signal reproduction means;

a comparator adapted to compare each envelope level outputted from the envelope detector with the predetermined threshold value; and a position information generator adapted to detect the position of each discontinuous interval, based on the result of the comparison from the comparator and output the detected position to the additional information inserting means.

7. An apparatus in accordance with claim 5, wherein the synchronous block size comparing circuit comprises:

a synchronous block counter adapted to count the size of synchronous blocks sequentially outputted from of the signal reproduction means;

a comparator adapted to compare the synchronous block size outputted from the synchronous block counter with the size of synchronous blocks reproduced in the normal reproduction mode; and a position information generator adapted to detect the position of each discontinuous interval, base on the result of the comparison from the comparator, and send the detected position to the additional information inserting means.

8. A method for reproducing digital video signals at a varied speed, comprising the steps of:

(a) initializing an index indicative of the number of encoded macroblocks of a slice for compressed digital video signals and maximum coded length information indicative of the number of bits coded with the maximum length when a slice start code is detected from one of the digital video signals;

(b) comparing the index with the total number of macroblocks included in the slice to be encoded, encoding a macroblock just following the encoded macroblocks when the index is not more than the total macroblock number, counting the coded length of the currently encoded macroblock, and comparing the counted coded length with the maximum coded length information;

(c) storing the counted coded length as new maximum coded length information when the coded length is determined to be more than the maximum coded length information at the step (b), and incrementing the index by one;

(d) only incrementing the index by one without storing the counted coded length as new maximum coded length information when the coded length is not determined to be more than the maximum coded length information at the step (b); and (e) repeatedly executing the steps (b) to (d) when the index is not determined to be more than the total macroblock number at the step (b), and inserting the maximum coded length information in a slice header of the slice when the index is determined to be more than the total macroblock number at the step (b).

9. A method for reproducing digital video signals at a varied speed, comprising the steps of:

(a) clearing a coded length of a previously decoded slice just preceding a slice to be currently decoded when a slice start code of the current slice is detected, initializing an index, indicative of the number of decoded macroblocks of the current slice, to be "1", and detecting maximum coded length information and slice condition information inserted in a slice header of the current slice;

(b) checking whether the detected slice condition information is "0" indicative of a completely decodable slice or "1" indicative of an incomplete slice involving a discontinuous interval, and executing a decoding for all the macroblocks included in the current slice when the detected slice condition information is "0";

(c) detecting slice length information when the detected slice condition information is "1", and executing a decoding for one of the macroblocks of the current slice, based on the detected slice length information;

(d) counting the coded length of the decoded macroblock, and comparing the difference between the counted coded length and the detected slice length information with the detected maximum coded length information;

(e) executing a next macroblock just following the decoded macroblock when the difference between the counted coded length and the detected slice length information is not less than the maximum coded length information, and adding the coded length of the decoded next macroblock to the coded length of the first macroblock to count the total decoded length of the current slice;

(f) incrementing the index by one after completing the step (e), repeatedly executing the steps (c) to (e) until the difference between the total decoded length of the current slice and the detected slice length information is less than the maximum coded length information, and stopping the decoding of the step (c) until a slice start code of a next slice just following the current slice when the difference between the total decoded length of the current slice decoded and the detected slice length information is less than the maximum coded length information.

* * * * *